(12) United States Patent
Ji

(10) Patent No.: US 10,500,973 B2
(45) Date of Patent: Dec. 10, 2019

(54) ELECTRIC VEHICLE AND CONTROL METHOD THEREOF

(71) Applicants: HYUNDAI MOTOR COMPANY, Seoul (KR); KIA MOTORS CORPORATION, Seoul (KR)

(72) Inventor: Myoung-Kyoung Ji, Yongin-si (KR)

(73) Assignees: Hyundai Motor Company, Seoul (KR); Kia Motors Company, Seoul (KR)

(*) Notice: Subject to any disclaimer, the term of this patent is extended or adjusted under 35 U.S.C. 154(b) by 150 days.

(21) Appl. No.: 15/646,541

(22) Filed: Jul. 11, 2017

(65) Prior Publication Data

US 2018/0236898 A1   Aug. 23, 2018

(30) Foreign Application Priority Data

Feb. 22, 2017 (KR) .................. 10-2017-0023255

(51) Int. Cl.

| | |
|---|---|
| B60L 15/00 | (2006.01) |
| B60L 15/20 | (2006.01) |
| B60K 35/00 | (2006.01) |
| G01C 21/36 | (2006.01) |
| B60L 50/51 | (2019.01) |
| B60L 58/12 | (2019.01) |

(Continued)

(52) U.S. Cl.
CPC .......... B60L 15/2045 (2013.01); B60K 35/00 (2013.01); B60K 37/04 (2013.01); B60L 50/51 (2019.02); B60L 50/64 (2019.02); B60L 58/12 (2019.02); G01C 21/3611 (2013.01); G01C 21/3697 (2013.01); B60K 2370/11 (2019.05); B60K 2370/1438 (2019.05); B60K 2370/152 (2019.05); B60K 2370/161 (2019.05); B60K 2370/169 (2019.05); B60K 2370/52 (2019.05); B60K 2370/828 (2019.05);

(Continued)

(58) Field of Classification Search
CPC .................................................. B60L 15/2045
See application file for complete search history.

(56) References Cited

U.S. PATENT DOCUMENTS 8,882,634 B2 * 11/2014 Banker ............... B60W 10/196
477/5
9,067,505 B2 * 6/2015 Jeong .................. B60L 11/1866

(Continued)

FOREIGN PATENT DOCUMENTS

| JP | 2015-115978 A | 6/2015 |
|---|---|---|
| KR | 10-1221427 B1 | 1/2013 |
| KR | 10-2014-0110291 A | 9/2014 |

*Primary Examiner* — Truc M Do
(74) *Attorney, Agent, or Firm* — Morgan, Lewis & Bockius LLP

(57) ABSTRACT

An electric vehicle and a control method of the electric vehicle are provided. The electric vehicle includes a battery, a charger configured to supply power of the battery to a user terminal, an input configured to receive a destination from a user, and a controller configured to calculate an estimated amount of power consumed for traveling of the electric vehicle and an estimated amount of power consumed for supplying power to the user terminal in a case that the electric vehicle travels to the destination. The controller is configured to determine a charging method of the charger based on a current amount of charge of the battery, the estimated amount of power consumed for travelling of the electric vehicle, and the estimated amount of power consumed for supplying power to the user terminal.

20 Claims, 7 Drawing Sheets

(51) Int. Cl.
  *B60L 50/64* (2019.01)
  *B60K 37/04* (2006.01)
  *H04L 29/08* (2006.01)
  *H04B 1/3827* (2015.01)
(52) U.S. Cl.
  CPC ..... *B60K 2370/834* (2019.05); *B60L 2210/14* (2013.01); *B60L 2210/42* (2013.01); *G01C 21/3661* (2013.01); *H04B 1/3833* (2013.01); *H04L 67/12* (2013.01); *Y02T 10/645* (2013.01); *Y02T 10/7005* (2013.01); *Y02T 10/705* (2013.01); *Y02T 10/7044* (2013.01); *Y02T 10/7225* (2013.01); *Y02T 10/7241* (2013.01); *Y02T 10/7283* (2013.01)

(56) References Cited

U.S. PATENT DOCUMENTS

| | | | |
|---|---|---|---|
| 9,272,712 B2 * | 3/2016 | Meyer | G07C 5/085 |
| 9,393,921 B1 * | 7/2016 | Weicker | G01R 31/382 |
| 9,662,984 B2 * | 5/2017 | Park | B60L 1/00 |
| 9,718,455 B2 * | 8/2017 | Yu | B60W 10/06 |
| 9,759,573 B2 * | 9/2017 | Meyer | G01C 21/3469 |
| 9,834,114 B2 * | 12/2017 | Hettrich | H04W 4/029 |
| 10,009,851 B1 * | 6/2018 | Puech | H04W 52/027 |
| 10,048,082 B2 * | 8/2018 | Meyer | G01C 21/3469 |
| 10,076,970 B2 * | 9/2018 | Khosravi | B60K 6/48 |
| 2002/0188387 A1 * | 12/2002 | Woestman | B60K 6/00 701/22 |
| 2008/0262668 A1 * | 10/2008 | Yamada | B60K 6/46 701/22 |
| 2011/0115439 A1 * | 5/2011 | Kim | H01M 10/443 320/136 |
| 2013/0158868 A1 * | 6/2013 | Chen | G01C 21/3469 701/527 |
| 2015/0258909 A1 * | 9/2015 | Kim | B60L 11/1861 701/36 |
| 2016/0001671 A1 * | 1/2016 | Mori | B60L 11/1816 701/22 |
| 2017/0151884 A1 * | 6/2017 | Khosravi | B60K 6/48 |

* cited by examiner

ELECTRIC VEHICLE AND CONTROL METHOD THEREOF

CROSS-REFERENCE TO RELATED APPLICATION

The present application is based on and claims the benefit of priority to Korean Patent Application No. 10-2017-0023255, filed on Feb. 22, 2017 with the Korean Intellectual Property Office, the entire disclosure of which is incorporated herein by reference.

TECHNICAL FIELD

Embodiments of the present disclosure relate to an electric vehicle and control method of the electric vehicle.

BACKGROUND

Vehicles can be classified into internal combustion engine vehicles, hybrid electric vehicles, and pure electric vehicles depending on the type of power source generating the driving force. The internal combustion engine vehicle is the most commonly used type of vehicle that burns fossil fuels and generates electric power. Electric vehicles have been developed and are ever increasing to solve problems of depletion of fossil fuels used as fuel for the internal combustion engine vehicles and environmental pollution problems.

As an example of the electric vehicle, the hybrid electric vehicle includes a motor and an internal combustion engine. The hybrid electric vehicle drives the motor by charging a battery with electric power generated internally, or by receiving electric power from the outside to charge the battery.

As another example of the electric vehicle, the pure electric vehicle drives an electric motor by charging a battery with electricity generated from a chemical reaction between hydrogen and oxygen, or by receiving the electric power from the outside to charge the battery.

Since it is hard to drive the electric vehicle if the battery for driving the motor is not sufficiently charged, it is very important to establish a plan to efficiently manage the charged battery prior to driving the electric vehicle.

SUMMARY

As an aspect of one or more exemplary embodiments, an electric vehicle and control method thereof is provided to predict power consumption of the electric vehicle and determine a power distribution scheme of a battery.

According to an exemplary embodiment, an electric vehicle includes a battery, a charger configured to supply power of the battery to a user terminal, an input configured to receive a destination from a user, and a controller configured to calculate an estimated amount of power consumed for traveling of the electric vehicle and an estimated amount of power consumed for supplying power to the user terminal in a case that the electric vehicle travels to the destination. The controller is configured to determine a charging method of the charger based on a current amount of charge of the battery, the estimated amount of power consumed for travelling of the electric vehicle, and the estimated amount of power consumed for supplying power to the user terminal.

The controller may reduce a current charging amount per unit time of the charger if the current amount of charge of the battery is less than or equal to the estimated amount of power consumed for travelling of the electric vehicle and the estimated amount of power consumed for supplying power to the user terminal.

The controller may, after reducing the current charging amount per unit time of the charger, recalculate the estimated amount of power consumed for travelling of the electric vehicle and the estimated amount of power consumed for supplying power to the user terminal, in a case that the electric vehicle travels to the destination, and if the recalculation result reveals that the current amount of charge of the battery is less than or equal to the estimated amount of power consumed for travelling of the electric vehicle and the estimated amount of power consumed for supplying power to the user terminal, stop supplying power from the charger.

The electric vehicle may further include a communicator connected to the user terminal to communicate with the user terminal. The controller may release a connection of the communicator with the user terminal if the recalculation result reveals that the current amount of charge of the battery is less than or equal to the estimated amount of power consumed for travelling of the electric vehicle and the estimated amount of power consumed for supplying power to the user terminal.

The electric vehicle may further include a display. The controller may control the display to display a screen informing that a charging amount per unit time of the charger has decreased, if the recalculation result reveals that the current amount of charge of the battery is greater than the estimated amount of power consumed for travelling of the electric vehicle and the estimated amount of power consumed for supplying power to the user terminal.

When the input receives the destination from the user, the controller may calculate an estimated amount of power consumed for travelling of the electric vehicle and an estimated amount of power consumed for supplying power to the user terminal in a case that the electric vehicle travels to the destination.

The controller may calculate an available travel distance of the electric vehicle based on the current amount of charge of the battery and the current charging amount per unit time of the charger if the destination is not set.

The electric vehicle may further include a display. The display may display the available travel distance of the electric vehicle.

The electric vehicle may further include a communicator connected to the user terminal and configured to receive an image from the user terminal. The controller may control resolution of the image based on a remaining battery charge amount of the user terminal, if the current amount of charge of the battery is greater than the estimated amount of power consumed for travelling of the electric vehicle and the estimated amount of power consumed for supplying power to the user terminal.

The controller may determine whether a preset reference time has elapsed after connection between the communicator and the user terminal if the current amount of charge of the battery is greater than the estimated amount of power consumed for travelling of the electric vehicle and the estimated amount of power consumed for supplying power to the user terminal, and change the resolution of the image based on the remaining battery charge amount of the user terminal if the reference time has not elapsed.

According to an exemplary embodiment, a control method of an electric vehicle driving a motor by using electric power charged in a battery, the control method includes supplying, by a charger, power of the battery to a user terminal, receiving, by an input, a destination from a user, calculating, by a controller, an estimated amount of power consumed for traveling of the electric vehicle and an estimated amount of power consumed for supplying power to the user terminal in a case that the electric vehicle travels to the destination, and determining, by the controller, a charging method of the charger based on a current amount of charge of the battery, the estimated amount of power consumed for travelling of the electric vehicle, and the estimated amount of power consumed for supplying power to the user terminal.

Determining the charging method of the charger may include reducing a current charging amount per unit time of the charger if the current amount of charge of the battery is less than or equal to the estimated amount of power consumed for travelling of the electric vehicle and the estimated amount of power consumed for supplying power to the user terminal.

Determining the charging method of the charger may include recalculating the estimated amount of power consumed for travelling of the electric vehicle and the estimated amount of power consumed for supplying power to the user terminal in a case that the electric vehicle travels to the destination, and stopping supplying power from the charger, if the recalculation result reveals that the current amount of charge of the battery is less than or equal to the estimated amount of power consumed for travelling of the electric vehicle, and the estimated amount of power consumed for supplying power to the user terminal.

Stopping supplying power from the charger may include stopping supplying power from the charger and releasing connection of the communicator to the user terminal, if the recalculation result reveals that the current amount of charge of the battery is less than or equal to the estimated amount of power consumed for travelling of the electric vehicle, and the estimated amount of power consumed for supplying power to the user terminal.

Determining charging method of the charger may include controlling a display to display a screen informing that a charging amount per unit time of the charger has decreased, if the recalculation result reveals that the current amount of charge of the battery is greater than the estimated amount of power consumed for travelling of the electric vehicle, and the estimated amount of power consumed for supplying power to the user terminal.

The control method may further include determining, by the controller, whether a destination is set, prior to receiving a destination. Calculating an estimated amount of power consumed for traveling of the electric vehicle and an estimated amount of power consumed for supplying power to the user terminal in a case that the electric vehicle travels to the destination may include calculating, if the destination is set, the estimated amount of power consumed for traveling of the electric vehicle and the estimated amount of power consumed for supplying power to the user terminal in a case that the electric vehicle travels to the destination.

The control method may further include calculating an available travel distance of the electric vehicle based on the current amount of charge of the battery and the current charging amount per unit time of the charger if any destination is not set, prior to receiving a destination.

The control method may further include displaying, by a display, the available travel distance of the electric vehicle.

Determining a charging method of the charger may include changing resolution of an image received from the user terminal based on a remaining battery charge amount of the user terminal, if the current amount of charge of the battery is greater than the estimated amount of power consumed for travelling of the electric vehicle, and the estimated amount of power consumed for supplying power to the user terminal.

Changing the resolution of an image may include determining whether a preset reference time has been elapsed after connection between the communicator and the user terminal, if the current amount of charge of the battery is greater than the estimated amount of power consumed for travelling of the electric vehicle, and the estimated amount of power consumed for supplying power to the user terminal, and changing the resolution of the image based on the remaining battery charge amount of the user terminal if the reference time has not elapsed.

BRIEF DESCRIPTION OF THE DRAWINGS

The patent or application file contains at least one drawing executed in color. Copies of this patent or patent application publication with color drawings will be provided by the Office upon request and payment of the necessary fee.

These above and/or other aspects of the disclosure will become apparent and more readily appreciated from the following description of exemplary embodiments, taken in conjunction with the accompanying drawings in which.

DETAILED DESCRIPTION

Figure 1:
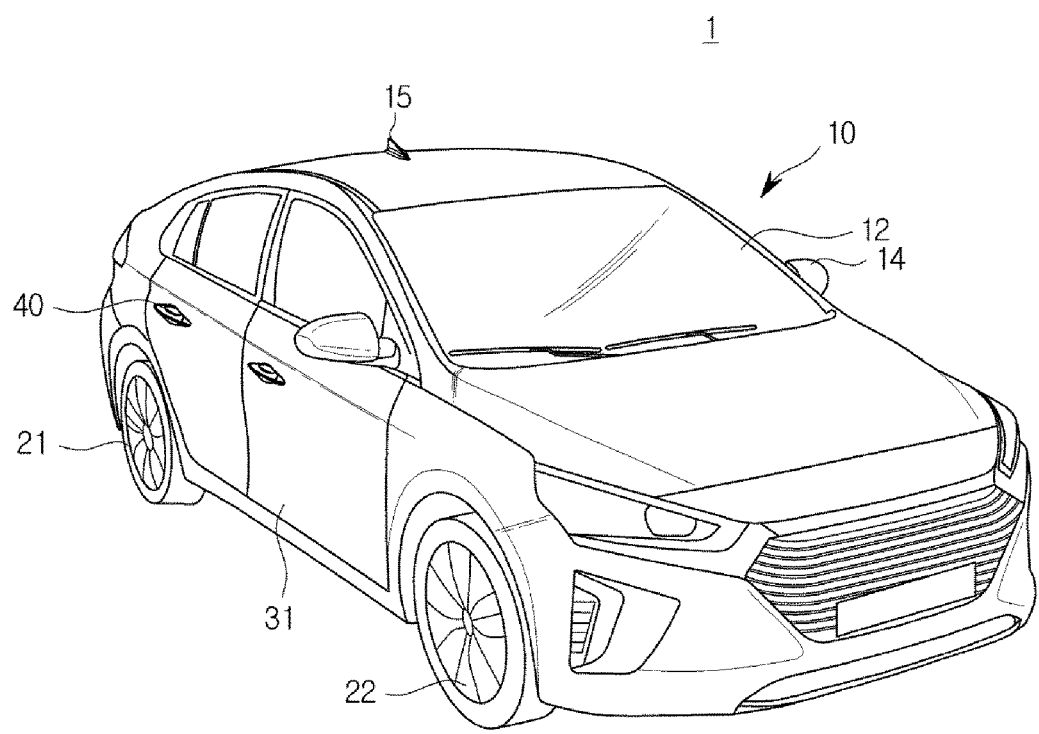
FIG. 1 is a view illustrating an electric vehicle according to an exemplary embodiment of the present disclosure.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence and/or operations is not limited to what is set forth herein and may be changed as is known in the art, with the exception of operations necessarily occurring in a particular order. In addition, respective descriptions of well-known functions and constructions may be omitted for clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

Hereinafter, an operation principle and embodiments of an electric vehicle, a system including the electric vehicle, and a battery charging method of the electric vehicle will be described with reference to the accompanying drawings.

FIG. 1 is a view illustrating external features of an electric vehicle 1 according to an exemplary embodiment of the present disclosure.

A windshield 12 is provided on an upper front side of a main body 10 to protect a passenger from the wind while providing a front view to the passenger inside the electric vehicle 1. An outside mirror 14 provides a side and rear-side view of the electric vehicle 1 to the passenger. The outside mirror 14 may be provided for each of doors 31 on left and right sides.

The door 31 is pivotally mounted on the left and right sides of the main body 10 allowing the passenger to get in and out when it is opened and shielding the interior of the electric vehicle 1 from the outside when the door 31 is closed. The door 31 may be locked or unlocked using a door lock device 40. The locking or the unlocking with the door locking device 40 is carried out by a user approaching the electric vehicle 1 and manipulating buttons or levers of the door locking device 40 in person or by a method of operating a remote controller to lock or unlock remotely.

An antenna 15 is to receive broadcasting/communication signals such as telematics, DMB, digital TV, GPS, etc. The antenna 15 may be a multifunctional antenna which receives various types of broadcasting/communication signals or a single functional antenna which receives a type of broadcasting/communication signals.

Front wheels 22 and rear wheels 21 are located on the front and back of the electric vehicle 1 and are rotated by being powered from an engine (not shown).

Figure 2:
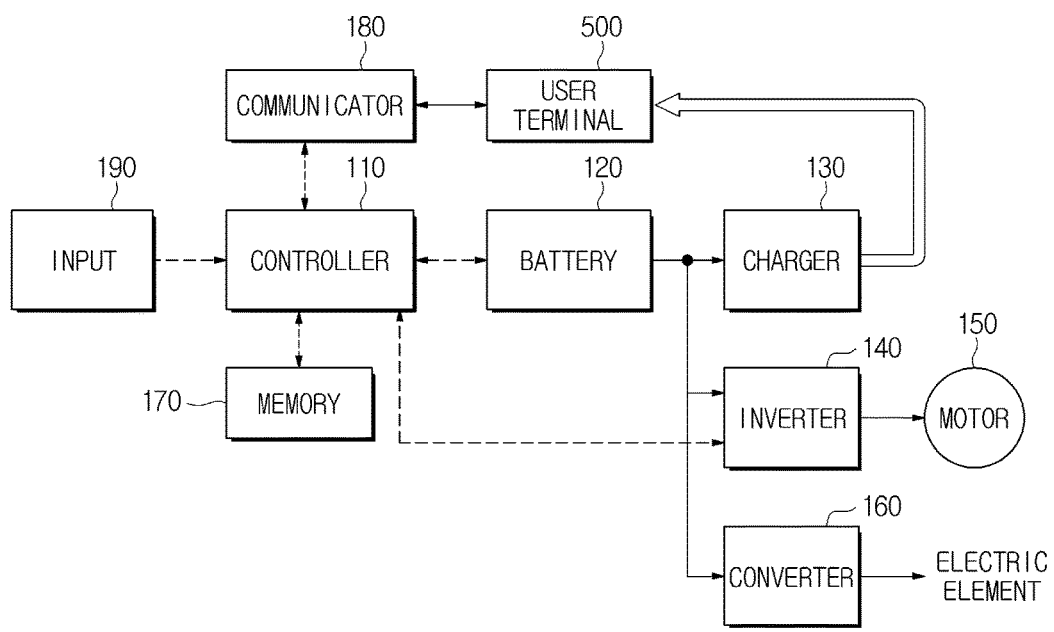
FIG. 2 is a control block diagram of the electric vehicle according to an exemplary embodiment of the present disclosure.

FIG. 2 is a control block diagram of an electric vehicle according to an exemplary embodiment of the present disclosure.

Referring to FIG. 2, the electric vehicle 1 according to an exemplary embodiment of the present disclosure includes a controller 110, a battery 120, a charger 130, an inverter 140, a motor 150, a converter 160, a memory 170, a communicator 180, an input 190, and other electric elements.

The controller 110 is a processor which controls each electric element of the electric vehicle 1, and may be a processor of an Electronic Controller (ECU) that controls overall operation of a power system. Alternatively, the controller 110 may be a processor of a battery management system (BMS) which controls and manages charging and a discharging of the battery 120 and the like.

In an embodiment, the controller 110 may reduce power consumption of the battery 120 by controlling a connecting method between the electric vehicle 1 and a user terminal 500 connected to the electric vehicle 1 or by controlling a charging method of the user terminal 500 according to an operation schedule of the electric vehicle 1 and a battery charging state (SOC) of the battery 120.

The user terminal 500 may be implemented as a computer or a portable terminal that may be connected to the electric vehicle 1 via a network or charged by the electric vehicle 1. The computer may include, for example, a notebook computer, a desktop computer, a laptop computer, a tablet Personal Computer (PC), a slate PC, and the like, each of which is equipped with a web browser. The portable terminal may include all kinds of handheld-based wireless communication devices such as a Personal Communication System (PCS) terminal, a Global System for Mobile communications (GSM), a Personal Digital Cellular (PDC) terminal, a Personal Handyphone System (PHS) terminal, a Personal Digital Assistant (PDA) terminal, an International Mobile Telecommunication (IMT)-2000 terminal, a Code Division Multiple Access (CDMA)-2000 terminal, a W-Code Division Multiple Access (W-CDMA) terminal, a Wireless Broadband Internet (WiBro) terminal, and a smart phone, etc. The portable terminal may also include a wearable device such as a watch, a ring, a bracelet, an ankle, a necklace, glasses, a contact lens, and a head-mounted-device (HMD), etc.

The SOC represents the percentage (%) of a current charging state of the battery 120. It is the same concept as a fuel gauge of the vehicle equipped with an internal combustion engine.

In FIG. 2, dotted arrows each between two of the controller 110, the battery 120, the inverter 140, the communicator 180, and the memory 170 represent flows of control signals transmitted through the CAN (Control Area Network) and solid arrows each between two of the battery 120, the inverter 140, the DC/DC converter 160, the motor 150, and the charger 130 indicate flows of electric power of the battery 120. A thick solid arrow between the communicator 180 and the user terminal 500 indicates flows of communication signals exchanged between the communicator 180 and the user terminal 500. An arrow formed with double solid line from the charger 130 to the user terminal 500 shows a flow of the electric power of the battery 120 supplied from the charger 130.

The battery 120 stores the electric power supplied from the outside through plug-in connection. The electric power stored in the battery 120 is used as driving energy for the motor 150.

The charger 130 supplies the electric power supplied from the battery 120 to the user terminal 500 by wire or wirelessly. The charger 130 may include various wireless charging systems such as a magnetic induction system, a magnetic resonance system, or a microwave system, or various terminal connection systems such as a universal serial bus (USB), a high definition multimedia interface (HDMI), a digital visual interface (DVI), RS-232, or a power line, but is not limited thereto.

The inverter 140 converts a voltage of the battery 120 into a polyphase alternate current (AC) voltage (for example, three-phase AC voltage of U, V, W) and supplies the converted voltage to the motor 150. A control signal for controlling a shape of the polyphase AC voltage to be generated in the inverter 140 is applied to the inverter 140.

The motor 150 is driven by the polyphase AC voltage of the inverter 140 to generate power (rotational force). The rotational force of the motor 150 is used to rotate the front wheel 22 or the rear wheel 21 of the electric vehicle 1.

The converter 160 boosts or reduces a DC voltage supplied from the battery 120 to a predetermined level. The DC voltage output from the converter 160 is supplied to various electric elements (for example, an equalizing component, the controller 110, a multimedia device, or the like) equipped in the electric vehicle 1.

According to one exemplary embodiment, the converter 160 may provide electric power to the display 210 (see FIG. 3) that provides multimedia to the user in the electric vehicle 1.

The memory 170 stores data or software/firmware necessary for the controller 110 to perform control operation. For example, the memory 170 may store a driving schedule of the electric vehicle 1, a set temperature of an air conditioner 162, information about an SOC of the battery 120, and the like.

The memory 170 may be a nonvolatile memory device such as a cache, a read only memory (ROM), a programmable ROM (PROM), an erasable programmable ROM (EPROM), an electrically erasable programmable ROM (EEPROM), and a flash memory, but is not limited thereto. The memory 170 may be a volatile memory device such as a random access memory (RAM), or a storage medium such as a CD-ROM, and a hard disk drive (HDD), but is not limited thereto. The memory 170 may be implemented as a separate chip from the controller 110 and a single chip with the processor.

The communicator 180 refers to a module that transmits and receives information to and from the user terminal 500, a server, or the like, which exists outside the electric vehicle 1.

The communicator 180 may convert a received signal into an electrical signal and transfer the electrical signal to the controller 110 or transmit the control signal generated by the controller 110 to another device such as the user terminal 500.

For example, the communicator 180 may perform at least one of short-range communication, wired communication, and wireless communication.

Specifically, the short-range communication may be a method of transmitting and receiving signals using a wireless communication network in a short range, such as Bluetooth, infrared communication, Radio Frequency Identification (RFID) communication, Wireless Local Access Network (WLAN) communication, (Near-field communication (NFC), and Zigbee communication, but is not limited thereto.

The wired communication may include various cable communications such as Universal Serial Bus (USB), High Definition Multimedia Interface (HDMI), Digital Visual Interface (DVI), RS-232 (recommended standard 232), power line or plain old telephone service, but is not limited thereto, and may include Controller Area Network (CAN) communication, which is mainly used in the vehicle industry.

In addition to WiFi and WiBro, wireless communication can be implemented in a variety of communication systems such as GSM, CDMA, WCDMA, universal mobile telecommunications system (UMTS) (Time Division Multiple Access), and Long Term Evolution (LTE), but is not limited thereto.

To perform the short-range communication or the wireless communication, the communicator 180 may include an antenna 15 for transmitting and receiving radio waves, elements for modulating and demodulating signals, and the like.

The communicator 180 may be provided on one device or one module together with the charger 130. In this case, when the communicator 180 is connected to the user terminal 500, the charger 130 may start charging the user terminal 500.

The input 190 may include various hardware devices such as buttons, switches, a pedal, a keyboard, a mouse, a track-ball, various levers, a handle, a stick, etc. which may receive various user commands 190.

In addition, the input 190 may include a software device, e.g., a Graphical User Interface (GUI) such as a touch pad or the like for user input. The touch pad can be implemented with a touch screen panel (TSP) to form a mutual layer structure with a display.

The input 190 according to an exemplary embodiment may set a destination according to a user command to provide a navigation service, and receive another user command to release the connection with the user terminal 500 or to change resolution of an output connectivity image. The connectivity will be described later.

At least one component may be added or deleted to correspond to the performance of the components of the electric vehicle 1 shown in FIG. 2. It will be understood by those skilled in the art that mutual positions of the components may be changed to correspond to performance or structure of the system.

Some components illustrated in FIG. 2 may be software components or hardware components such as Field Programmable Gate Arrays (FPGAs) and Application Specific Integrated Circuits (ASICs), but is not limited thereto.

Figure 3:
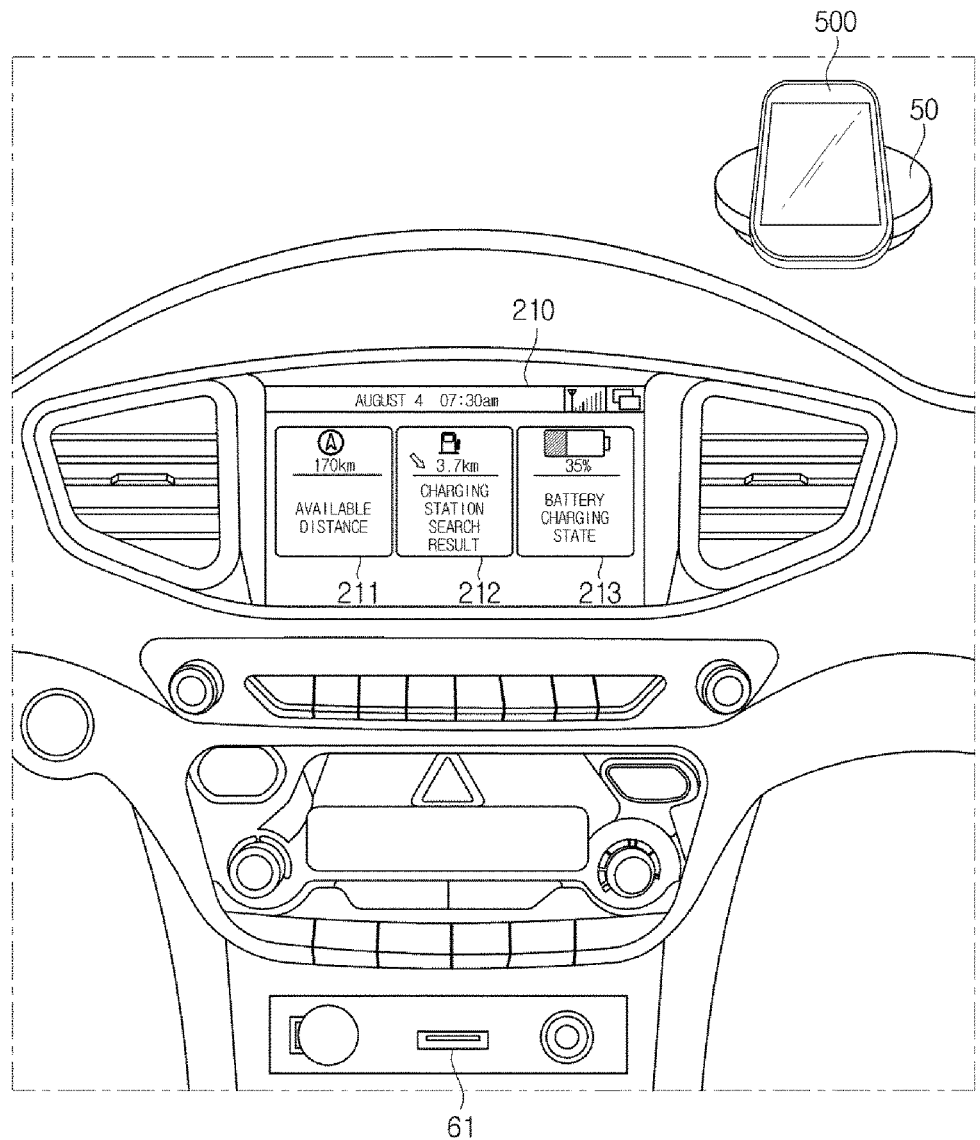
FIGS. 3 to 5 are views illustrating the inside of the electric vehicle according to an exemplary embodiment of the present disclosure.
Figure 4:
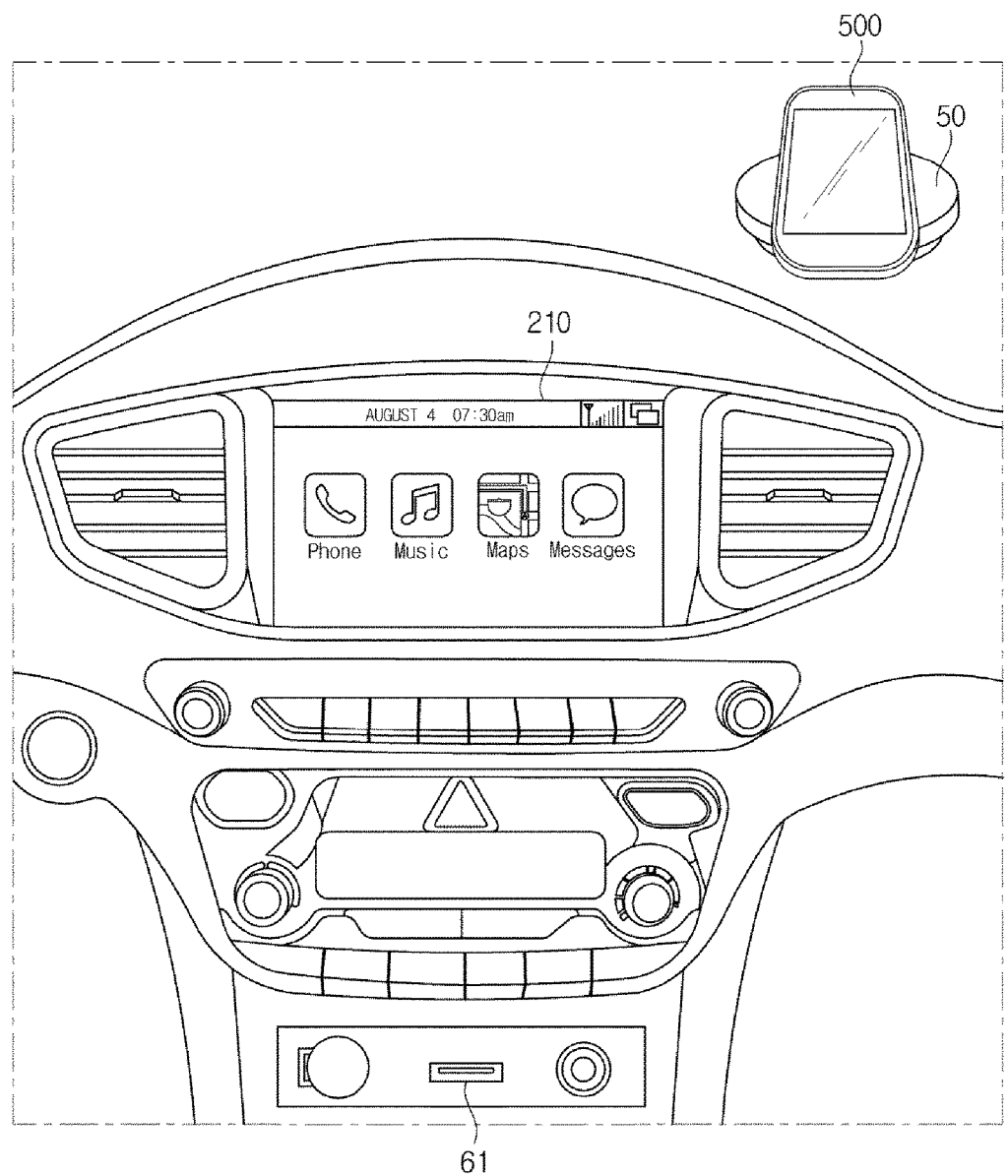
Figure 5:
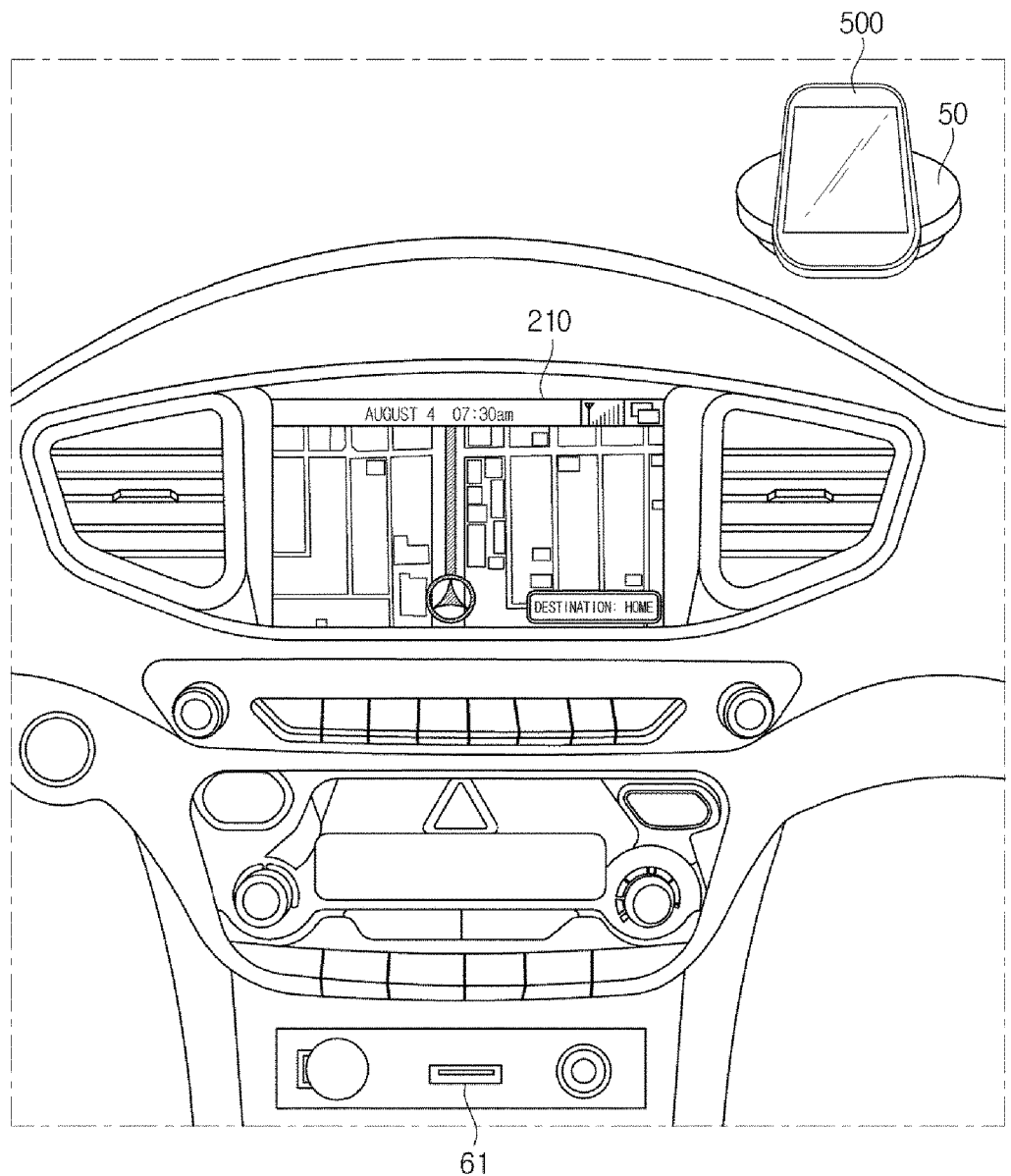

FIGS. 3 to 5 are views illustrating the inside of the electric vehicle according to an exemplary embodiment of the present disclosure. A display 210 for displaying various information indicating a current state of the electric vehicle 1, such as a state of a navigation screen, a state of an audio screen, and a state of an air conditioner, is arranged in the interior of the electric vehicle 1, for example, between a driver's seat and a passenger's seat. The electric vehicle 1 may be equipped with a wireless charger 50 for supplying electric power to the user terminal 500 and a connection terminal 61 for performing wired communication with the user terminal 500.

Referring to FIG. 3, the display 210 may display information, such as an available travel distance 211 of the electric vehicle 1, a charging station search result 212, and a battery charging state 213, necessary for the user to manage the battery 120 of the electric vehicle 1.

The available moving distance 211 indicates a maximum distance the vehicle can travel with the current amount of charge of the battery 120. The charging station search result 212 informs locations of electric charging stations in the vicinity of the electric vehicle 1. The battery charging state 213 indicates the percentage (%) of the SOC of the battery 120.

A wireless charger 50 is a device which wirelessly supplies power to the user terminal 500 located within a chargeable range, and may be arranged on a dashboard as shown in FIG. 3, but is not limited thereto.

The wireless charger 50 may employ at least one of a magnetic induction method, a magnetic resonance method, and a microwave method for wireless charging.

The charger 130 of FIG. 2 may include the wireless charger 50 illustrated in FIG. 3, but may also charge the user terminal 500 via a cable by including a terminal to be connected to the user terminal 500 through the cable. The terminal may be embodied as the connection terminal 61 of FIG. 3 in which case the charger 130 may be included in the communicator 180 for performing wired communication through the connection terminal 61.

The connection terminal 61 performs wired communication with the connected user terminal 500. For example, when the electric vehicle 1 provides a connectivity service, the connection terminal 61 may receive various information from the user terminal 500, such as a battery remaining amount of the user terminal 500, application information provided by the user terminal 500, an output screen image of the user terminal 500, an acoustic signal generated at the user terminal 500, and the like, and may transmit a request signal to the user terminal 500 to receive various data.

The communicator 180 described above with reference to FIG. 2 includes the connection terminal 61 illustrated in FIG. 3, but may also include a wireless communication module or a short-range communication module to perform the wireless communication or the short-range communication. In this case, the wireless communication module or the short-range communication module may be arranged in the wireless charger 50 of FIG. 3.

Referring to FIG. 4, when the user terminal 500 and the communicator 180 of the electric vehicle 1 are connected, the connectivity image may be displayed on the display 210, and the connectivity image may be provided in the form of displaying an application list provided by the user terminal 500. FIG. 4 is only an example of an application list that may be displayed, without being limited thereto.

The "connectivity" is a technique for outputting information to the display 210 or controlling the electric vehicle 1 based on a signal transmitted from the user terminal 500. An example of the connectivity service provided by the electric vehicle 1 may be an Apple car CarPlay®, Android Auto®, and Nokia Mirrorlink®. However, the example of the connectivity service provided by the electric vehicle 1 is not limited thereto, but may be a broad concept including changes within a range that those skilled in the art may easily understand.

Further, referring to FIG. 4, the navigation screen may be displayed on the display 210, and when the destination is set, the display 210 may display various information relating to a route such as a distance to the destination to the user in accordance with the control signal of the controller 110.

Although not shown, an image being displayed on the user terminal 500 may be output to the display 210 as the connectivity image.

In addition, various screens requiring a user's selection command may be output to the display 210, and the screen of the display 210 is not limited to the examples shown in FIGS. 3 to 5.

Further, the display 210 may be mounted not only at the position shown in FIGS. 3 to 5 but also at other various positions in the electric vehicle 1.

The display 210 may be implemented using a plasma display panel (PDP), light emitting diode (LEDs), a liquid crystal display (LCD), or the like, and may include a touch screen device.

Hereinafter, a control method of the electric vehicle according to an exemplary embodiment of the present disclosure will be described. The electric vehicle 1 according to the above-described embodiment may be applied to the control method of the electric vehicle. Therefore, the above description of the electric vehicle 1 may also be applied to the control method of the electric vehicle.

Figure 6:
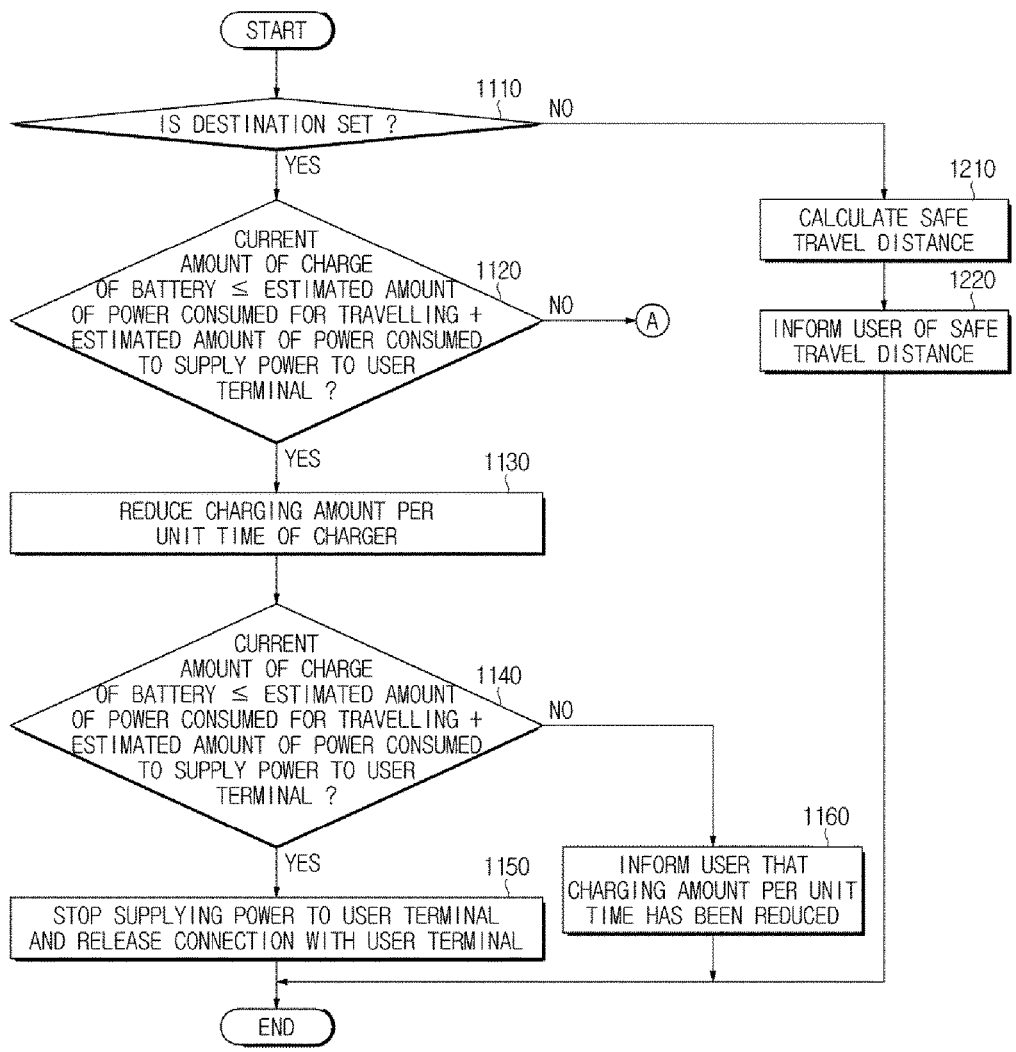
FIGS. 6 and 7 are flowcharts showing an example of the control method of the electric vehicle according to an exemplary embodiment.
Figure 7:
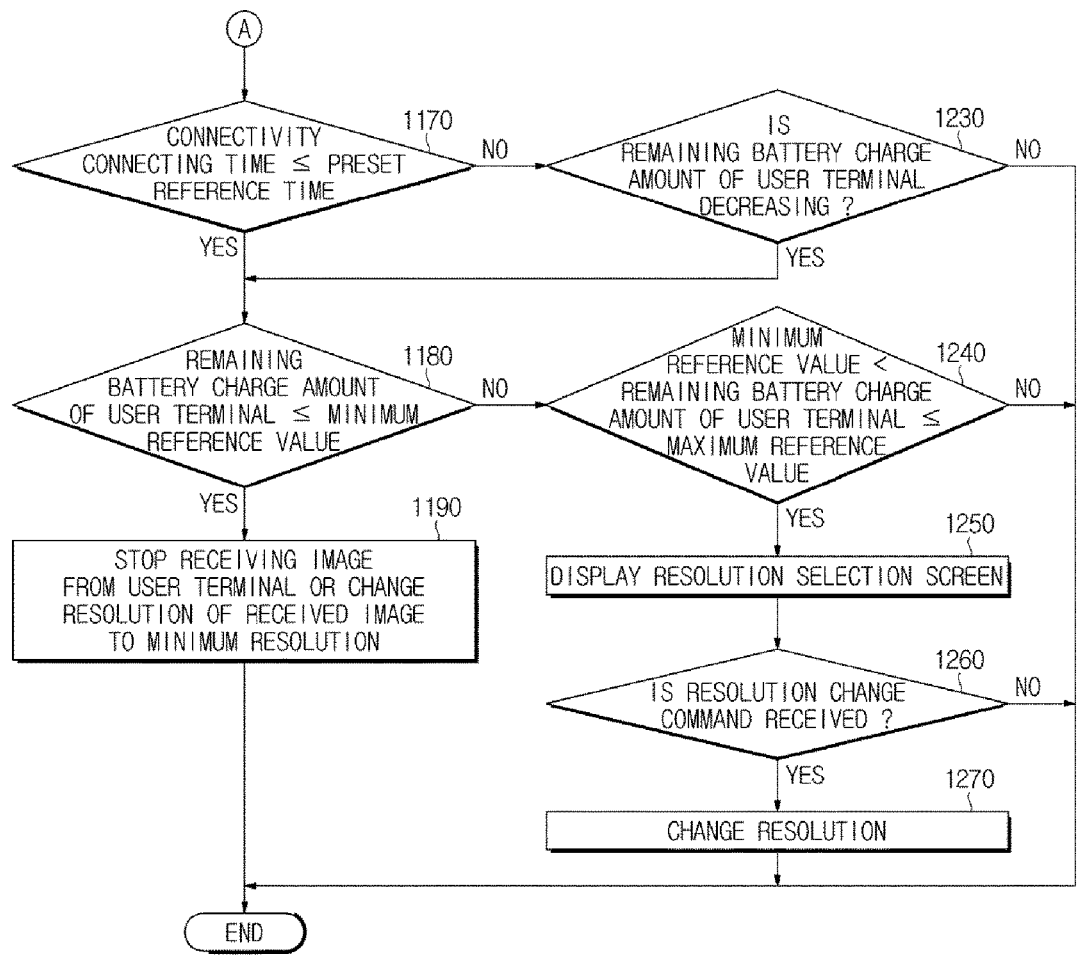

FIGS. 6 and 7 are flowcharts showing an example of the control method of the electric vehicle according to an exemplary embodiment. In FIGS. 6 and 7, the electric vehicle 1 will be described on the assumption that the electric vehicle 1 is connected with the user terminal 500 through the communicator 180 and the user terminal 500 is being charged through the charger 130.

First, a control method of the electric vehicle 1 when the controller 110 sets the destination of the electric vehicle 1 from the user through the input 190 ("Yes" in 1110) will be described.

The controller 110 calculates an estimated amount of power to be consumed for the electric vehicle 1 to travel to the set destination and an estimated amount of power consumed for supplying power to the user terminal 500 when the electric vehicle 1 travels to the set destination. The controller 110 determines a charging method of the charger based on a current amount of charge (SOC) of the battery 120, the estimated amount of power consumed for the travelling of the electric vehicle 1 and the estimated amount of power consumed for supplying power to the user terminal 500 (1120, 1130).

Specifically, the controller 110 compares the sum of the estimated amount of power consumed for the travelling of the electric vehicle 1 and the estimated amount of power consumed for supplying power to the user terminal 500 with the current amount of charge (SOC) of the battery 120 (1120).

If the current amount of charge (SOC) of the battery 120 is less than or equal to the sum of the estimated amount of power consumed for the travelling of the electric vehicle 1 and the estimated amount of power consumed for supplying power to the user terminal 500 ("Yes" of 1120) or if the current amount of charge (SOC) of the battery 120 is less than or equal to the sum of the estimated amount of power consumed for the travelling of the electric vehicle 1, the estimated amount of power consumed for supplying power to the user terminal 500, and a preset error reference value, the controller 110 reduces a charging amount per unit time of the charger 130 (1130).

Reducing the charging amount per unit time of the charger 130 may include adjusting an amount of charging current per unit time in a case that the charger 130 wirelessly charges the user terminal 500.

Further, Reducing the charging amount per unit time of the charger 130 may include adjusting the connecting method between the charger 130 and the user terminal 500 in a case that the charger 130 charges the user terminal 500 on wire. For example, when the charger 130 is implemented as a USB terminal, the controller 110 may change the connecting method of the USB terminal from a Dedicated Charging Port (DCP) to a Charging Downstream Port (CDP) method or a Standard Downstream Port (SDP) method, or from the CDP method to the SDP method.

After reducing the charging amount per unit time of the charger 130, the controller 110 recalculates the estimated amount of power consumed for traveling of electric vehicle 1 in the case the electric vehicle 1 travels to the set destination and the estimated amount of power consumed for supplying power to the user terminal 500 in the case the electric vehicle 1 travels to the set destination. Based on the current amount of charge (SOC) of the battery 120, the estimated amount of power consumed for travelling of the electric vehicle 1, and the estimated amount of power consumed for supplying power the user terminal 500, the controller 110 controls the charger 130 to stop supplying (i.e., charging) power to the user terminal 500, controls the communicator 180 to release connection with the user terminal 500 (1150) or controls the display 210 to display a screen informing the user that the charging amount per unit time of the charger 130 has been reduced (1160).

Specifically, as a result of the recalculation, if the current amount of charge (SOC) of the battery 120 is less than or equal to the sum of the estimated amount of power consumed for the travelling of the electric vehicle 1 and the estimated amount of power consumed for supplying power to the user terminal 500 ("YES" of 1140), or if the current amount of charge (SOC) of the battery 120 is less than or equal to the sum of the estimated amount of power consumed for the travelling of the electric vehicle 1, the estimated amount of power consumed for supplying power to the user terminal 500, and the preset error reference value, the controller controls the charger 130 to stop charging the user terminal 500 and controls the communicator 180 to release the connection with the user terminal 500 (1500).

However, as a result of the recalculation, if the current amount of charge (SOC) of the battery 120 is greater than the sum of the estimated amount of power consumed for the travelling of the electric vehicle 1 and the estimated amount of power consumed for supplying power to the user terminal 500 500 ("NO" of 1140) or if the current amount of charge (SOC) of the battery 120 is greater than the sum of the estimated amount of power consumed for the travelling of the electric vehicle 1, the estimated amount of power consumed for supplying power to the user terminal 500, and the preset error reference value, the controller 110 controls the display 210 to display the screen informing the user that the charging amount per unit time of the charger 130 has been reduced (1160).

In the step 1120 where the controller 110 compares the sum of the estimated amount of power consumed for the travelling of the electric vehicle 1 and the estimated amount of power consumed for supplying power to the user terminal 500 with the current amount of charge (SOC) of the battery 120, if the current amount of charge (SOC) of the battery 120 is greater than the sum of the estimated amount of power consumed for the travelling of the electric vehicle 1 and the estimated amount of power consumed for supplying power to the user terminal 500 500 ("NO" of 1120) or if the current amount of charge (SOC) of the battery 120 is greater than the sum of the estimated amount of power consumed for the travelling of the electric vehicle 1, the estimated amount of power consumed for supplying power to the user terminal 500, and the preset error reference value, referring to FIG. 7, the controller 110 determines whether a preset reference time has elapsed since the communicator 180 and the user terminal 500 were connected (1170). if the reference time has not elapsed ("YES" of 1170), i.e., if the user terminal 500 is connected within a short period of time, the controller 110 changes resolution of the image received from the user terminal 500 based on the remaining battery charge amount of the user terminal 500 (1180, 1190, and 1240-1270).

The image received from the user terminal 500 may be a connectivity image reproduced intact from an image displayed on the user terminal.

Changing the resolution of an image may include transmitting a request to change the resolution of the image to the user terminal 500 through the communicator 180 and receiving the image with the changed resolution from the user terminal 500. As the lower resolution image is received from the user terminal 500, the power consumption of the user terminal 500 may be reduced.

Specifically, if the preset reference time has not elapsed since the user terminal 500 was connected ("YES" of 1170), the controller 110 compares the remaining battery charge amount of the user terminal 500 with a preset minimum reference value and a maximum reference value. If the remaining battery charge amount of the user terminal 500 is less than or equal to the minimum reference value ("YES" of 1180), the controller 110 stops receiving the image from the user terminal 500 but receives a sound signal, or changes the resolution of the received image to a minimum resolution (1190).

However, if the remaining battery charge amount of the user terminal 500 is greater than the minimum reference value but less than or equal to the maximum reference value ("NO" of 1180, "YES" in 1240), the controller 110 may control the display 210 to display a resolution selection screen (1250). If a resolution change command is received from the user through the input 190 ("YES" of 1260), the controller 110 may change the resolution of the image received from the user terminal 500 according to the resolution change command (1270). If the remaining battery charge amount of the user terminal 500 is greater than the maximum reference value ("NO" of 1240) or the resolution change command is not received ("NO" of 1260), the controller 110 may maintain the current resolution of the image received from the user terminal 500.

For example, the resolution change command may include a command to change the resolution to any one of 480p, 720p, and 1080p.

If the preset reference time has elapsed since the user terminal 500 was connected ("NO" of 1170), i.e., if the user terminal 500 has already been connected), the controller 110 may determine whether the remaining battery charge amount of the user terminal 500 is decreasing with time (1230). When the remaining batter charge amount is decreasing ("YES" of 1230), the controller 110 may compare the remaining battery charge amount of the user terminal 50 with the minimum reference value and the maximum reference value as described above in 1180 and 1240 and may change the resolution of the image received from the user terminal 500 or stop receiving the image (1190, 1250-1270). On the other hand, if the remaining battery charge amount of the user terminal 500 is not decreasing with time ("NO" of 1230), the controller 110 may maintain the current resolution of the image received from the user terminal 500.

Determining the remaining battery charge amount of the user terminal 500 (1230) may include receiving battery status information from the user terminal 500 (for example, Battery Service (BAS)) through the communicator 180 and determining remaining battery charge amount of the user terminal 500 based on the battery status information.

Referring again to FIG. 6, if any destination of the electric vehicle 1 is not set ("NO" of 1110), the controller 110 may calculate an available travel distance that the electric vehicle may travel (i.e., a safe travel distance) (1210) based on the amount of charge of the battery 110 and electricity charging amount per hour of the charger 130 and may inform the user of the available travel distance to the user through the display 210 (see 211 of FIG. 3) (1220).

As is apparent from the above description, according to the electric vehicle and the control method of the electric vehicle according to embodiments of the present disclosure, the limited battery power may be efficiently consumed by controlling a charging method or connecting method of a user terminal.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An electric vehicle comprising:
   a battery;
   a charger configured to supply power of the battery to a user terminal;
   an input configured to receive a destination from a user; and
   a controller configured to calculate an estimated amount of power consumed for traveling of the electric vehicle and an estimated amount of power consumed for supplying power to the user terminal in a case that the electric vehicle travels to the destination,
   wherein the controller is configured to determine a charging method of the charger based on a current amount of charge of the battery, the estimated amount of power consumed for travelling of the electric vehicle, and the estimated amount of power consumed for supplying power to the user terminal.

2. The electric vehicle according to claim 1, wherein the controller is configured to reduce a current charging amount per unit time of the charger if the current amount of charge of the battery is less than or equal to the estimated amount of power consumed for travelling of the electric vehicle and the estimated amount of power consumed for supplying power to the user terminal.

3. The electric vehicle according to claim 2, wherein the controller is configured to, after reducing the current charging amount per unit time of the charger, recalculate the estimated amount of power consumed for travelling of the electric vehicle and the estimated amount of power consumed for supplying power to the user terminal in a case that the electric vehicle travels to the destination, and
   if the recalculation result reveals that the current amount of charge of the battery is less than or equal to the estimated amount of power consumed for travelling of the electric vehicle and the estimated amount of power consumed for supplying power to the user terminal, stop supplying power from the charger.

4. The electric vehicle according to claim 3, further comprising a communicator connected to the user terminal to communicate with the user terminal,
   wherein the controller is configured to release a connection of the communicator with the user terminal if the recalculation result reveals that the current amount of charge of the battery is less than or equal to the estimated amount of power consumed for travelling of the electric vehicle and the estimated amount of power consumed for supplying power to the user terminal.

5. The electric vehicle according to claim 3, further comprising a display,
   wherein the controller is configured to control the display to display a screen informing that a charging amount per unit time of the charger has decreased, if the recalculation result reveals that the current amount of charge of the battery is greater than the estimated amount of power consumed for travelling of the electric vehicle and the estimated amount of power consumed for supplying power to the user terminal.

6. The electric vehicle according to claim 1, wherein, when the input receives the destination from the user, the controller is configured to calculate an estimated amount of power consumed for travelling of the electric vehicle and an estimated amount of power consumed for supplying power to the user terminal in a case that the electric vehicle travels to the destination.

7. The electric vehicle according to claim 6, wherein the controller is configured to calculate an available travel distance of the electric vehicle based on the current amount of charge of the battery and the current charging amount per unit time of the charger if the destination is not set.

8. The electric vehicle according to claim 7, further comprising a display,
   wherein the display displays the available travel distance of the electric vehicle.

9. The electric vehicle according to claim 2, further comprising a communicator connected to the user terminal and configured to receive an image from the user terminal,
   wherein the controller is configured to control resolution of the image based on a remaining battery charge amount of the user terminal, if the current amount of charge of the battery is greater than the estimated amount of power consumed for travelling of the electric vehicle and the estimated amount of power consumed for supplying power to the user terminal.

10. The electric vehicle according to claim 9, the controller is configured to determine whether a preset reference time has elapsed after connection between the communicator and the user terminal if the current amount of charge of the battery is greater than the estimated amount of power consumed for travelling of the electric vehicle and the estimated amount of power consumed for supplying power to the user terminal, and change the resolution of the image based on the remaining battery charge amount of the user terminal if the reference time has not elapsed.

11. A control method of an electric vehicle driving a motor by using electric power charged in a battery, the control method comprising:
- supplying, by a charger, power of the battery to a user terminal;
- receiving, by an input, a destination from a user;
- calculating, by a controller, an estimated amount of power consumed for traveling of the electric vehicle and an estimated amount of power consumed for supplying power to the user terminal in a case that the electric vehicle travels to the destination; and
- determining, by the controller, a charging method of the charger based on a current amount of charge of the battery, the estimated amount of power consumed for travelling of the electric vehicle, and the estimated amount of power consumed for supplying power to the user terminal.

12. The control method according to claim 11, wherein the determining of a charging method of the charger comprises
reducing a current charging amount per unit time of the charger if the current amount of charge of the battery is less than or equal to the estimated amount of power consumed for travelling of the electric vehicle and the estimated amount of power consumed for supplying power to the user terminal.

13. The control method according to claim 12, wherein the determining of a charging method of the charger comprises:
- recalculating the estimated amount of power consumed for travelling of the electric vehicle and the estimated amount of power consumed for supplying power to the user terminal in a case that the electric vehicle travels to the destination; and
- stopping supplying power from the charger if the recalculation result reveals that the current amount of charge of the battery is less than or equal to the estimated amount of power consumed for travelling of the electric vehicle, and the estimated amount of power consumed for supplying power to the user terminal.

14. The control method according to claim 13, wherein the stopping of supplying power from the charger comprises
stopping supplying power from the charger and releasing connection of the communicator to the user terminal if the recalculation result reveals that the current amount of charge of the battery is less than or equal to the estimated amount of power consumed for travelling of the electric vehicle, and the estimated amount of power consumed for supplying power to the user terminal.

15. The control method according to claim 13, wherein the determining of a charging method of the charger comprises
controlling a display to display a screen informing that a charging amount per unit time of the charger has decreased if the recalculation result reveals that the current amount of charge of the battery is greater than the estimated amount of power consumed for travelling of the electric vehicle, and the estimated amount of power consumed for supplying power to the user terminal.

16. The control method according to claim 11, further comprising determining, by the controller, whether a destination is set, prior to the receiving of a destination,
wherein calculating an estimated amount of power consumed for traveling of the electric vehicle and an estimated amount of power consumed for supplying power to the user terminal in a case that the electric vehicle travels to the destination comprises calculating, if the destination is set, the estimated amount of power consumed for traveling of the electric vehicle and the estimated amount of power consumed for supplying power to the user terminal in a case that the electric vehicle travels to the destination.

17. The control method according to claim 16, further comprising calculating an available travel distance of the electric vehicle based on the current amount of charge of the battery and the current charging amount per unit time of the charger if any destination is not set, prior to the receiving of a destination.

18. The control method according to claim 17, further comprising displaying, by a display, the available travel distance of the electric vehicle.

19. The control method according to claim 12, wherein the determining of a charging method of the charger comprises
changing resolution of an image received from the user terminal based on a remaining battery charge amount of the user terminal if the current amount of charge of the battery is greater than the estimated amount of power consumed for travelling of the electric vehicle, and the estimated amount of power consumed for supplying power to the user terminal.

20. The control method according to claim 19, wherein the changing of resolution of an image comprises:
- determining whether a preset reference time has been elapsed after connection between the communicator and the user terminal, if the current amount of charge of the battery is greater than the estimated amount of power consumed for travelling of the electric vehicle, and the estimated amount of power consumed for supplying power to the user terminal; and
- changing the resolution of the image based on the remaining battery charge amount of the user terminal if the reference time has not elapsed.

* * * * *